United States Patent [19]

Theiss et al.

[11] Patent Number: 4,596,361
[45] Date of Patent: Jun. 24, 1986

[54] SAFETY CONTROL

[75] Inventors: John J. Theiss, St. Louis, Mo.; Paul T. Durst, Louisville, Ky.

[73] Assignee: Temp. Systems, Inc., St. Louis, Mo.

[21] Appl. No.: 710,469

[22] Filed: Mar. 11, 1985

[51] Int. Cl.⁴ ............................................ G05D 23/12
[52] U.S. Cl. .................................. 236/99 B; 219/513; 236/DIG. 2
[58] Field of Search ............ 236/DIG. 2, 99 B, 99 R; 219/512, 513, 517; 337/2

[56] References Cited

U.S. PATENT DOCUMENTS

| | | | |
|---|---|---|---|
| 2,387,792 | 10/1945 | Holmes | 236/DIG. 2 |
| 2,392,613 | 1/1946 | Persons | 236/DIG. 2 |
| 2,463,599 | 3/1949 | Branson | 236/99 R X |
| 2,463,699 | 3/1949 | Klug | 236/99 B |
| 2,837,287 | 6/1958 | Miller et al. | 236/DIG. 2 |

Primary Examiner—William E. Tapolcai
Attorney, Agent, or Firm—Edward R. Weber

[57] ABSTRACT

This invention relates generally to apparatus wherein a change in temperature is transmitted from a sensing bulb through a capillary to a control device. More particularly this invention is related to a novel, fail safe device for use in conjunction with a temperature sensing bulb, capillary, and control device in an oven or other heating appliance.

5 Claims, 3 Drawing Figures

SAFETY CONTROL

This invention relates generally to apparatus wherein a change in temperature is transmitted from a sensing bulb through a capillary to a control device, which control device regulates the application of heat to the area surrounding the sensing bulb. More particularly this invention is related to a novel, fail safe device for use in conjunction with a temperature sensing bulb, capillary, and control device in an oven or other heating appliance.

Conventional thermostatic control devices used in home ovens and other heating devices typically have a controller consisting of a bulb located within the heated area, a bellows or other operator located outside the heated area, and a capillary connecting the bulb and the operator. The entire system, bulb, capillary, and operator, is filled with a thermally responsive material so that as the bulb is exposed to heat, the material expands and thus moves the bellows or operator. Temperature control within the oven is obtained by linking the operator to a switch or valve so that the source of heat to the oven is turned off when the operator has moved a predetermined amount. The system works very well as long as the bulb, capillary, and bellows or other operator remains pressure-tight, so that an increase in the volume of the thermally responsive material results in movement of the operator. However, frequently a leak will develop in the system with the result that the thermally responsive material is permitted to leak out. When this occurs, an increase in heat in the area of the bulb does not cause a change in the position of the operator. There is thus no control to terminate the source of heat and a severe overheat situation may result. In extreme cases, this may cause a fire or, at a minimum, may cause the burning of whatever material is contained within the oven or other heating appliance.

The instant invention is a device which will disconnect the source of heat when a loss of pressure within the bulb-capillary-operator system occurs. Thus the system, when it fails, will be rendered safe and will not create a fire hazard.

In the instant application, FIG. 1 represents a schematic of a typical control system used to control the temperature of an electrically heated oven.

Figure 1:
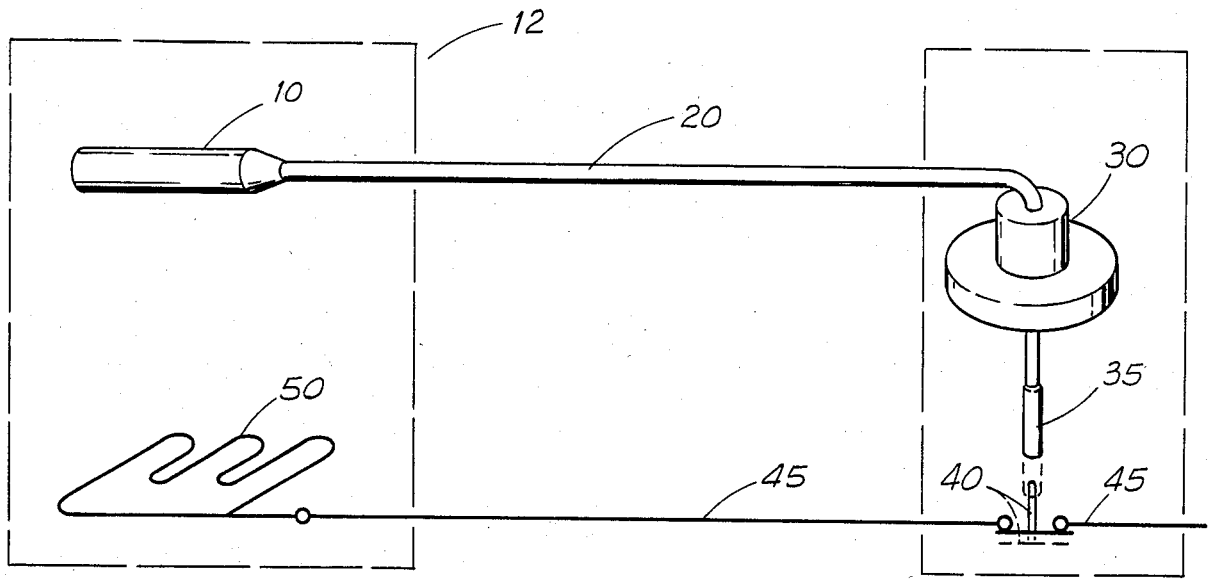

In FIG. 1, temperature sensing bulb 10 is located within the oven 12 or other area for which the temperature is to be controlled. Capillary 20 connects bulb 10 with operator 30, which operator in turn operates switch 40 through linkage 35. Switch 40 controls the electrical current flowing through line 45 to heating element 50. During normal operation, operator 30 and linkage 35 are calibrated so that switch 40, normally closed, will be opened when the temperature surrounding bulb 10 reaches a predetermined level. This is accomplished by constructing bulb 10 and capillary 20 so that they are essentially nonelastic. In contrast to this, operator 30 is fabricated so that it is substantially elastic and can change in size when the volume of the thermally responsive material inside it changes. The entire assembly of bulb 10, capillary 20, and operator 30 is filled with a thermally responsive material whose volume increases with increases in temperature. Thus, an increase in temperature surrounding bulb 10 will cause the material contained in bulb 10 to increase in volume. Since bulb 10 is essentially nonelastic, the increase in volume is transmitted through nonelastic capillary 20 to elastic operator 30, which increase in volume causes a change in the size of operator 30. When a predetermined change in size has occurred, linkage 35 opens switch 40 cutting off the electrical current to heating element 50. It is thus seen that a periodic cycling of switch 40 will serve to control the current through heating element 50 and, in turn, control the temperature of the space containing heating element 50 and bulb 10. As has been previously pointed out, however, a leak in either bulb 10, capillary 20, or operator 30 results in a failure of the system, so that an increase in the temperature surrounding bulb 10 does not result in the opening of switch 40. The heating elements thus are permitted to be constantly on and the control function is totally eliminated with occasionally disastrous results.

Figure 2:
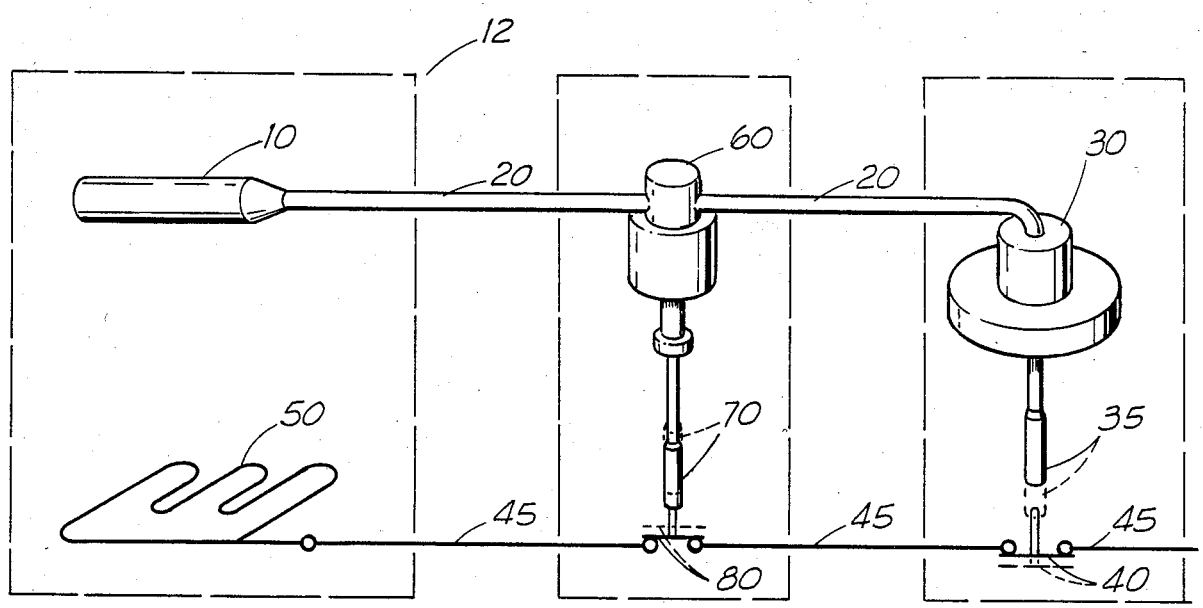
FIG. 2 represents the system as disclosed in FIG. 1 wherein the safety device of the instant invention has been incorporated into the system.

In FIG. 2, device 60, linkage 70, and switch 80 have been inserted in the system. Device 60 is linked to switch 80 in such a fashion that a decrease in the volume of thermally responsive material in capillary 20 causes device 60 to reposition linkage 70 permitting switch 80 to open and thus disconnecting electrical current from heating element 50. This way the system is fail safe, as any leakage in the control system will cause safety switch 80 to open. Thus, instead of having an overheat temperature condition, the heating element will be rendered inactive and the system will cool off and be rendered safe.

Device 60, linkage 70, and switch 80 are adjusted so that switch 80 will remain closed so long as the bulb-capillary-operator system retains its pressure integrity. Only when a decrease in pressure in the system occurs will device 60 reposition linkage 70 so as to permit switch 80 to open and prevent the flow of electrical current to heating element 50. When installed, the system is calibrated so that the basic pressure in the system is sufficient to compress bellows 65 and thus cause device 60 to be in an elongated state at ambient temperatures. In this at rest condition, the volume of the system is such that switch 80 is closed, as is switch 40. As the temperature in the oven increases, bulb 10 is heated and the thermally responsive material contained therein expands and is transmitted through capillary 20 to operator 30. When a certain degree of expansion has occurred, switch 40 opens. Bellows 65 and device 60 remain in the elongated state and switch 80 will remain closed regardless of the expansion of the thermally responsive material. It is only when a leak in the system causes the pressure in the system to drop below the basic pressure that device 60 shortens and repositions linkage 70 which in turn opens switch 80.

Figure 3:
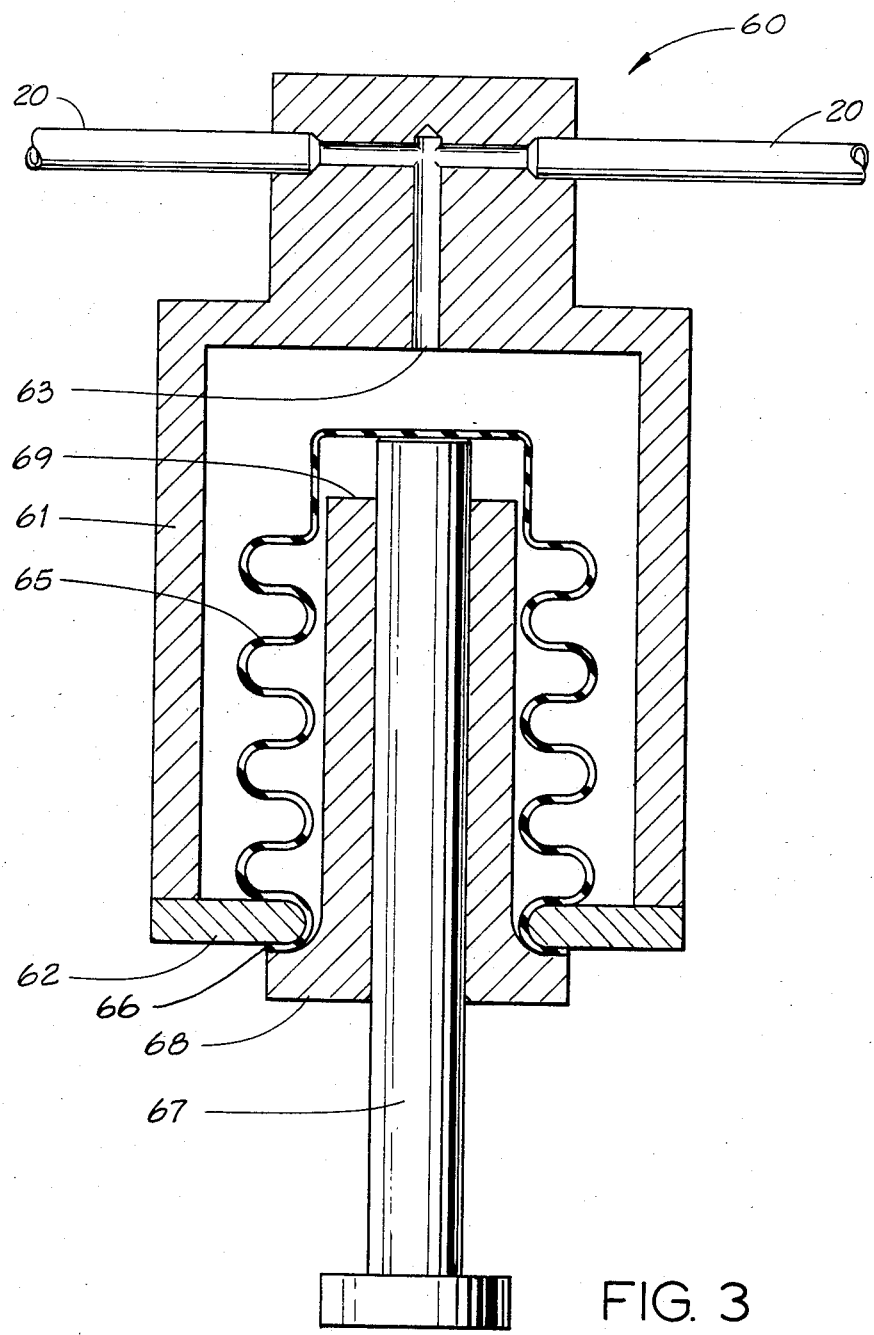
FIG. 3 is a cross-sectional view of a version of the safety device.

FIG. 3 presents a cross-sectional view of a preferred embodiment of safety device 60. In this embodiment, safety device 60 consists of: a rigid chamber 61 having an annular closure 62, a resilient bellows device 65 passing thru the annulus in closure 62, and a flanged tube 68 which seals the open end 66 of bellows 65 and closure 62, effectively creating a pressure containing chamber consisting of chamber 61, closure 62, bellows 65, and tube 68. A port 63 connects capillary 20 to the interior of said pressure containing chamber. Member 67 passes thru the center of tube 68 and transmits the longitudinal movement of bellows 65 to the exterior of control 60. Resilient bellows 65 is so designed that an increase in pressure in chamber 61 compresses the bellows, forcing member 67 out of tube 68 and creating an effective elongation of safety device 60. Conversely, a decrease in pressure will permit bellows 65 to return to its basic length causing member 67 to retract into tube 65, and thus effectively shortening safety device 60. As has been previously mentioned in the description of FIG. 2, this change is communicated to switch 80 through linkage 70. When installed, the system is calibrated so that the pressure in the system is sufficient to maintain bellows 65 in its compressed state at ambient temperatures. In this at rest condition, switch 80 is closed, as is switch 40. As the temperature in the oven increases, bulb 10 is heated and the compound expands and is transmitted through capillary 20 to operator 30. When a certain degree of expansion has occured, switch 40 opens. Bellows 65 remains compressed and safety control 60 remains in the elongated state throughout this nominal increase in pressure and switch 80 remains closed regardless of the increase in volume of the thermally responsive compound. It is only when a leak in the system occurs that the pressure in chamber 61 decreases to the point that bellows 65 returns to its basic length, thus causing member 67 to withdraw into tube 68, which in turn operates linkage 70 which opens switch 80.

In a particularly preferred embodiment, the length of flanged tube 68 is selected so that end 69 serves as a stop for bellows 65 thus serving to prevent distortion of bellows 65 through excess compression.

As will be understood, the operation of safety control 60 has been particularly described with respect to an electrically heated system. Other suitable valves or control devices can be substituted for switch 80 so that the safety control can be utilized with systems heated by oil, gas, steam or other sources of heat.

In view of the above, it will be seen that the objects of the invention are achieved and other advantageous results are obtained. As various changes can be made in the above constructions without departing from the scope of the invention, it is intended that all matter contained in the above description or shown in the accompanying drawings shall be interpreted as illustrative and not in a limiting sense.

What is claimed is:

1. In a temperature control system consisting of a nonelastic container adapted to be subject to temperature changes, a capillary tube connected to said container and extending to a pressure responsive device, a thermally expansible and contractable material filling said container, said tube, and said pressure responsive device, and a linkage connecting said pressure responsive device to a first control device whereby changes in the pressure responsive device, resulting from expansion or contraction of the expansible/contractable material, open or close the control device so as to regulate when a primary heating device is supplying heat, the improvement wherein a second pressure responsive mechanism is interconnected with the material-filled capillary tubing in such a fashion that failure of the expansible/contractable material to completely fill the bulb, capillary tube, pressure responsive device, and second pressure responsive mechanism will cause a change in the second pressure responsive mechanism, which change is communicated by a second linkage to a second control device, which second control device, when activated by the change in the second pressure responsive device prevents the primary heating device from supplying heat.

2. The mechanism of claim 1 wherein the primary heating device is an electrical heating element and the first and second control devices are switches controlling the flow of electric current to the electrical heating element.

3. The mechanism of claim 1 wherein the primary heating device is a burner and the first and second control devices are valves controlling the flow of combustible material to the burner.

4. The mechanism of claim 1 wherein the second pressure responsive mechanism includes a bellows which is maintained in an compressed state by the pressure derived from the thermally expansible material when the system is at ambient temperature and the second control device is an electrical micro-switch with contacts which are normally open, which contacts are maintained closed as long as the bellows remain compressed.

5. The mechanism of claim 1 wherein the linkage connecting the first and second pressure responsive mechanisms and the first and second control devices are non-electric mechanisms utilizing pneumatic or hydraulic operators.

* * * * *